US009449093B2

(12) United States Patent
Gur

(10) Patent No.: US 9,449,093 B2
(45) Date of Patent: Sep. 20, 2016

(54) SYSTEM AND METHOD FOR IMPROVED SEARCH EXPERIENCE THROUGH IMPLICIT USER INTERACTION

(75) Inventor: Nadav Gur, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 90 days.

(21) Appl. No.: 13/371,157

(22) Filed: Feb. 10, 2012

(65) Prior Publication Data

US 2012/0209840 A1 Aug. 16, 2012

Related U.S. Application Data

(60) Provisional application No. 61/441,564, filed on Feb. 10, 2011.

(51) Int. Cl.
*G06F 17/30* (2006.01)

(52) U.S. Cl.
CPC ... *G06F 17/30864* (2013.01); *G06F 17/30389* (2013.01); *G06F 17/30395* (2013.01)

(58) Field of Classification Search
None
See application file for complete search history.

(56) References Cited

U.S. PATENT DOCUMENTS

| 6,505,155 | B1 * | 1/2003 | Vanbuskirk | G10L 15/22 704/246 |
|---|---|---|---|---|
| 7,693,817 | B2 * | 4/2010 | Dumais et al. | 707/999.002 |
| 7,827,125 | B1 * | 11/2010 | Rennison | 706/14 |
| 8,005,823 | B1 * | 8/2011 | Marshall et al. | 707/721 |
| 8,615,514 | B1 * | 12/2013 | Fernandes et al. | 707/728 |
| 8,688,704 | B1 * | 4/2014 | Horling et al. | 707/737 |
| 8,938,463 | B1 * | 1/2015 | Kim et al. | 707/751 |
| 9,069,853 | B2 * | 6/2015 | Stading | |
| 2002/0083031 | A1 * | 6/2002 | De Varax | 707/1 |
| 2002/0178004 | A1 * | 11/2002 | Chang | G10L 15/07 704/246 |
| 2005/0066350 | A1 * | 3/2005 | Meuleman | H04N 7/17318 725/10 |
| 2005/0125382 | A1 * | 6/2005 | Karnawat et al. | 707/3 |
| 2005/0125390 | A1 * | 6/2005 | Hurst-Hiller et al. | 707/3 |
| 2005/0165745 | A1 * | 7/2005 | Hagale et al. | 707/3 |
| 2005/0210024 | A1 * | 9/2005 | Hurst-Hiller et al. | 707/5 |
| 2005/0251437 | A1 * | 11/2005 | Meuleman | G06F 17/30035 705/7.32 |
| 2006/0248057 | A1 * | 11/2006 | Jacobs et al. | 707/3 |
| 2006/0271524 | A1 | 11/2006 | Tanne et al. | |

(Continued)

OTHER PUBLICATIONS

Guy Desjardins et al., "Combining Relevance Feedback and Genetic Algorithms in an Internet Information Filtering Engine," Universite du Quebec a Montreal, RIAO'2000 Conference Proceedings, vol. 2 : pp. 10 (2000).

*Primary Examiner* — Bai D. Vu
(74) *Attorney, Agent, or Firm* — McCarter & English, LLP; Kia L. Freeman, Esq.

(57) ABSTRACT

Disclosed embodiments enable improved perception of a user's response and/or preferences. Search results responsive to a query are presented to the user. Parameters associated with an implicit user response are tracked. The implicit response may consist of a delay from the presentation of the user response; a speed of, a volume of, a tone of, or a word used in a user response; a speed, a direction, and/or a consistency of a pointer movement; a location of a touch; a change in a touch; and/or a user movement captured by a camera. Measurements and other information derived from the tracked parameters may be stored in a user profile, which may later be used to calculate a personalized implicit response. An implicit response may be calculated from the parameters. The implicit response may be used to qualify an explicit response, which may be the impetus to modify search results.

19 Claims, 6 Drawing Sheets

(56) References Cited

U.S. PATENT DOCUMENTS

| | | | |
|---|---|---|---|
| 2007/0106659 A1* | 5/2007 | Lu et al. .......................... 707/5 |
| 2007/0185858 A1 | 8/2007 | Lu et al. |
| 2007/0208730 A1* | 9/2007 | Agichtein et al. ................ 707/5 |
| 2008/0104045 A1* | 5/2008 | Cohen et al. ..................... 707/4 |
| 2008/0114751 A1* | 5/2008 | Cramer et al. .................... 707/5 |
| 2008/0199042 A1* | 8/2008 | Smith ........................... 382/100 |
| 2008/0243784 A1* | 10/2008 | Stading ............................ 707/3 |
| 2009/0216749 A1* | 8/2009 | Hardt ................ G06F 17/30867 |
| 2011/0208722 A1* | 8/2011 | Hannuksela ................. 707/723 |
| 2011/0264526 A1* | 10/2011 | Mital et al. ................. 705/14.55 |
| 2011/0264665 A1* | 10/2011 | Mital et al. .................... 707/741 |

\* cited by examiner

SYSTEM AND METHOD FOR IMPROVED SEARCH EXPERIENCE THROUGH IMPLICIT USER INTERACTION

RELATED APPLICATION

The present application is related to and claims priority to U.S. Provisional Patent Application No. 61/441,564 filed on Feb. 10, 2011, the entire contents of which are incorporated herein by reference.

FIELD OF THE INVENTION

At least one embodiment of the present invention relates to information searching, including Internet searching, vertical search, e-commerce related searching, and similar types of information searching.

BACKGROUND INFORMATION

In today's world, the growth in popularity of computers and the Internet has fueled an increasing availability of information. Computers and the Internet have simplified searching for information as compared to searching through hardcopies of books and articles in a library. An Internet user typically enters and submits requests for information (queries) through a search engine. The search engine scrutinizes searchable digital documents on the Internet, identifies relevant information, and returns a list of documents deemed relevant to the query entered by the user. In addition, the search engine displays a link to each document. The search engine may also display a little information in the document accessible through the link.

One problem in a conventional search system is that, even if the documents are ordered in terms of predicted relevance to the search query, they may not be ordered in accordance with the interests of the user. Another problem in a conventional search system is that information that may be included with the link to a document may not be the information of greatest interest to the user. Therefore, an Internet user who is seeking information about an item, such as a product or service, may have to review documents available through multiple links in order to find a single item matching his interests. This process can be tedious and time-consuming. Furthermore, if the user would like to assess multiple items and decide among them, for instance choose a product from a list of competing products, he may be faced with hundreds or even thousands of links to documents about items that may or may not match his interests. It can be tedious and time-consuming for the user to review the documents, identify the ones of greatest interest, obtain all of the related information of interest to the user from them, and then form opinions about a list of items.

SUMMARY OF THE INVENTION

The inventors recognized that current information search systems often produce search results that are not optimal from the user's prospective. The inventors recognized that non-optimal search results may be caused by limitations on the expression of the query and/or limited information about the user's true preferences with regard to search results. The inventors recognized that an improved understanding of an individual user's response could improve the user's search experience and/or enable the user to find a match to his true interests faster.

In particular, the inventors recognized that tracking a plurality of parameters associated with an individual user's implicit response to search results could improve the user's search experience and/or enable the user to find a true match to his interests faster. The inventors further recognized that an implicit response determined from the tracked parameters may be used to qualify an explicit response. Thus, depending on the qualification of the explicit response, an implicit response may be used as an impetus to adjust search results to match the user's interests better.

An implicit response differs from an explicit response in that an explicit response provides a type of invited feedback about the search result, each type having a corresponding classification, whereas an implicit response does not. An explicit response may be expressed through an action such as selecting an item from a list, clicking "NEXT" or "SAVE" in the context of a particular item, or selecting another discrete classification, such as "MATCH," "MEDIOCRE," "UNSURE," "POOR," or "NO MATCH." An explicit response may be expressed through an action such as pressing a button or key from among a selection of invited buttons or keys, or such as saying a word or phrase.

A user's implicit response to search results may include a delay from the presentation of the user response, a speed of the user response, a volume, a tone, a word used, a speed of a pointer movement, a direction of a pointer movement, a consistency of a pointer movement, a location of a touch, a change in a touch, and/or a user movement captured by a camera or similar means. A user's implicit response to search results may be calculated at least in part from a comparison of tracked parameter values with a model user profile. For example, based on the comparison with the model user profile, the implicit response may be classified as a long delay from the presentation, a fast response, a loud response, a shrill tone, an expletive word, a slow pointer movement, a hard touch, and/or an unusual lean toward the device presenting the search results.

The model user profile may include, for example, one or more measurements, averages, means, distributions, thresholds, and/or any statistical digest of the tracked parameters. The model user profile may include implicit responses, and/or any statistical digest of implicit responses. Moreover, any characteristic of an implicit response in the model user profile may be associated with an explicit response. For example, a long delay before an explicit negative response may indicate that the response is only somewhat negative, and should therefore be qualified as a "SOFT NEGATIVE." Similarly, a short delay before an explicit negative response may indicate that the response is largely negative, and should therefore be qualified as a "HARD NEGATIVE." Accordingly, an implicit response may be used to qualify an explicit response.

The inventors also recognized that the measurements of the tracked parameters associated with a user's implicit response may be stored in an individual user profile—alone or with the implicit responses themselves, averages, means, distributions, thresholds, and/or any statistical digest of any of the foregoing. The user profile may later be used as input to a search engine, a ranking process, and/or a filter to present search results in accordance with the individual user's preferences. In various embodiments, an individual user profile may be used as a basis for comparison instead of a model user profile as discussed above.

In one aspect, a computer-implemented method for generating a user profile for customizing search results comprises receiving a plurality of search queries from a user. For each of the plurality of search queries, the method for generating a user profile comprises presenting search results corresponding to the search query to the user; tracking, through at least one interaction device, a plurality of parameters associated with an implicit response of the user to the search results; and incorporating information derived from the plurality of tracked parameters into a stored profile of the user. The implicit response is selected from the group consisting of a timing of the user response, a speed of the user response, a volume of the user response, a tone of the user response, a consistency of the user response, extraneous oral content in the user response, a direction of a pointer movement, a location of a touch, and a change in a touch. The information derived from the plurality of tracked parameters is selected from the group consisting of measurements of tracked parameters, derivatives of measurements of tracked parameters, the implicit response of the user to the search results, and/or statistical digests of any of the foregoing. The method for generating a user profile further comprises receiving a subsequent search query from the user; presenting subsequent search results corresponding to the subsequent search query to the user; tracking, through at least one interaction device, a plurality of parameters associated with an implicit response of the user to the subsequent search results; and calculating, with the processor, an implicit response of the user to the subsequent search results. Calculating the implicit response is done at least in part by comparing information derived from at least one of the plurality of tracked parameters associated with the implicit response of the user response to the subsequent search results to related information in the stored profile.

In a second aspect, a system for generating a user profile for customizing search results comprises at least one processor, at least one computer readable medium coupled to the Internet, a bus enabling communication between the at least one processor and the at least one computer readable medium, and a computer program embodied on the at least one computer readable medium. The computer program comprises instructions for receiving a search query; instructions for presenting search results to the user based on the search query; instructions for tracking, through at least one interaction device, a plurality of parameters associated with an implicit response of a user to the presented search results; and instructions for incorporating, into a stored profile of the user, information derived from the plurality of tracked parameters. The implicit response is selected from the group consisting of a timing of the user response, a speed of the user response, a volume of the user response, a tone of the user response, a consistency of the user response, extraneous oral content in the user response, a direction of a pointer movement, a location of a touch, and a change in a touch. The information derived from the plurality of tracked parameters is selected from the group consisting of measurements of tracked parameters, derivatives of measurements of tracked parameters, the implicit response of the user to the search results, and/or statistical digests of any of the foregoing. The computer program further comprises instructions for calculating, with the processor, an implicit response of the user to the presented search results at least in part by comparing information derived from at least one of the plurality of tracked parameters to information in the stored profile.

In a third aspect, a computer-implemented method comprises receiving a first search query; presenting first search results to the user based on the first search query; and tracking, through at least one interaction device, at least one explicit response to the first search results and a plurality of parameters associated with a related implicit response. The at least one related implicit response is selected from the group consisting of a timing of the user response, a speed of the user response, a volume of the user response, a tone of the user response, a consistency of the user response, extraneous oral content in the user response, a direction of a pointer movement, a location of a touch, and a change in a touch. The computer-implemented method further comprises calculating, with a processor, at least one implicit response from the plurality of tracked parameters; and qualifying the at least one explicit response by the at least one implicit response.

In a second aspect, a system for improved perception of a user response comprises at least one processor; at least one computer readable medium coupled to the Internet; a bus enabling communication between the at least one processor and the at least one computer readable medium; and a computer program embodied on the at least one computer readable medium. The computer program comprises instructions for receiving a first search query; instructions for presenting first search results to the user based on the first search query; and instructions for tracking, through at least one interaction device, at least one explicit response to the first search results and a plurality of parameters associated with a related implicit response. The related implicit response is selected from the group consisting of a timing of the user response, a speed of the user response, a volume of the user response, a tone of the user response, a consistency of the user response, extraneous oral content in the user response, a direction of a pointer movement, a location of a touch, and a change in a touch. The computer program further comprises instructions for calculating, with a processor, at least one implicit response from the plurality of tracked parameters; and instructions for qualifying the at least one explicit response by the at least one implicit response.

Other objects and advantages of the various embodiments will become apparent in view of the following detailed description of the embodiments and the accompanying drawings.

DETAILED DESCRIPTION OF EMBODIMENTS OF THE INVENTION

I. Exemplary Computing Devices

Figure 1:
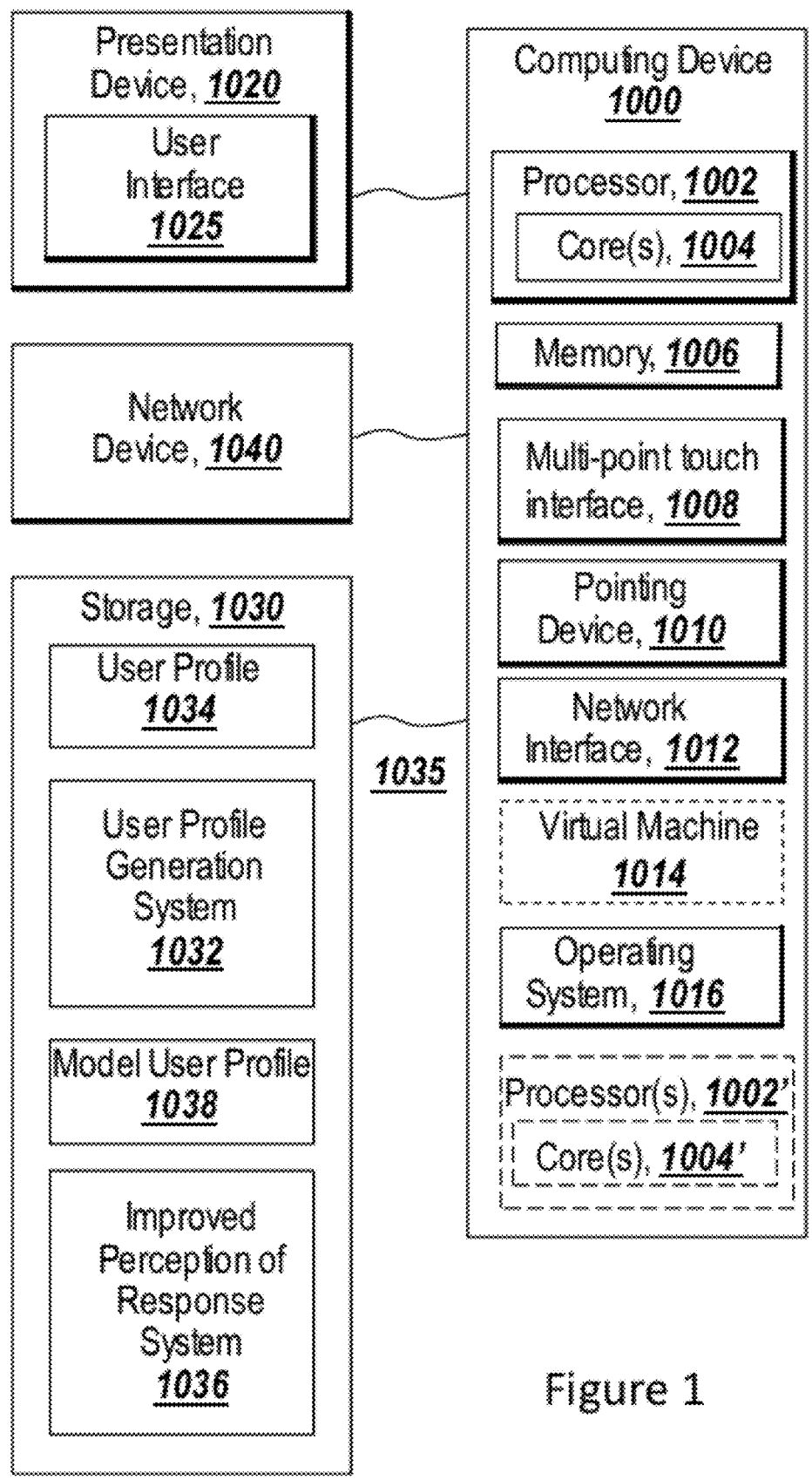
FIG. 1 is a block diagram of an exemplary computing device 1000 that may be used to perform any of the methods in the exemplary embodiments.

FIG. 1 is a block diagram of an exemplary computing device 1000 that may be used to perform any of the methods in the exemplary embodiments. The computing device 1000 may be any suitable computing or communication device or system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 1000 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash-drives), and the like. For example, memory 1006 included in the computing device 1000 may store computer-readable and computer-executable instructions, programs or software for implementing exemplary embodiments. Memory 1006 may include a computer system memory or random access memory, such as DRAM, SRAM, EDO RAM, and the like. Memory 1006 may include other types of memory as well, or combinations thereof.

The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

A user may interact with the computing device 1000 through a presentation device 1018 and at least one associated user interface 1025. For example, presentation device 1020 may be a visual display or a speaker. The associated user interface 1025 may be, for example, a pointing device (e.g., a mouse), multi-point touch interface, a touch-sensitive screen, a camera, or a microphone. As illustrated in FIG. 1, the presentation device 1020 may be inextricably linked to the associated user interface 1025. One example of an inextricably linked combination is a touch-sensitive screen that is both the user interface 1025 and a visual display presentation device 1020. The presentation device 1020 and the user interface 1025 may also have other uses. For example, a microphone and speaker on a mobile communication device may be used to make phone calls. The presentation device 1020, however, need not be inextricably linked to the associated user interface 1025. For example, the computing device 1000 may include other input/output (I/O) devices for receiving input from a user, for example, a keyboard or any suitable multi-point touch interface 1008, a pointing device 1010. The keyboard 1008 and the pointing device 1010 may be coupled to the presentation device 1020 and used as the user interface 1025. The computing device 1000 may include other suitable conventional I/O peripherals.

The computing device 1000 may include one or more storage devices 1030, such as a hard-drive, CD-ROM, or other computer readable media, for storing data and computer-readable instructions and/or software that implement portions of exemplary embodiments of a user profile generation system 1032 as taught herein and/or of an improved perception of response system 1036 at taught herein. The one or more exemplary storage devices 1030 may also optionally store one or more profiles, which may be generated and/or used in an embodiment of a system as taught herein. For example, the one or more exemplary storage devices 1030 may also store a user profile 1034, which may be generated by the user profile generation system 1032 as taught herein. Additionally or alternatively, the one or more exemplary storage devices 1030 may store a model user profile 1038, which may be used by the improved perception of response system 1036 at taught herein. A profile may be modified by operation of an embodiment of a system as taught herein or separately at any suitable time to add, delete or update one or more items therein. The computing device 1000 may communication with the one or more storage devices 1030 via a bus 1035. The bus 1035 may include parallel and/or bit serial connections, and may be wired in either a multidrop (electrical parallel) or daisy chain topology, or connected by switched hubs, as in the case of USB.

The computing device 1000 may include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

II. Exemplary Network Environments

Figure 2:
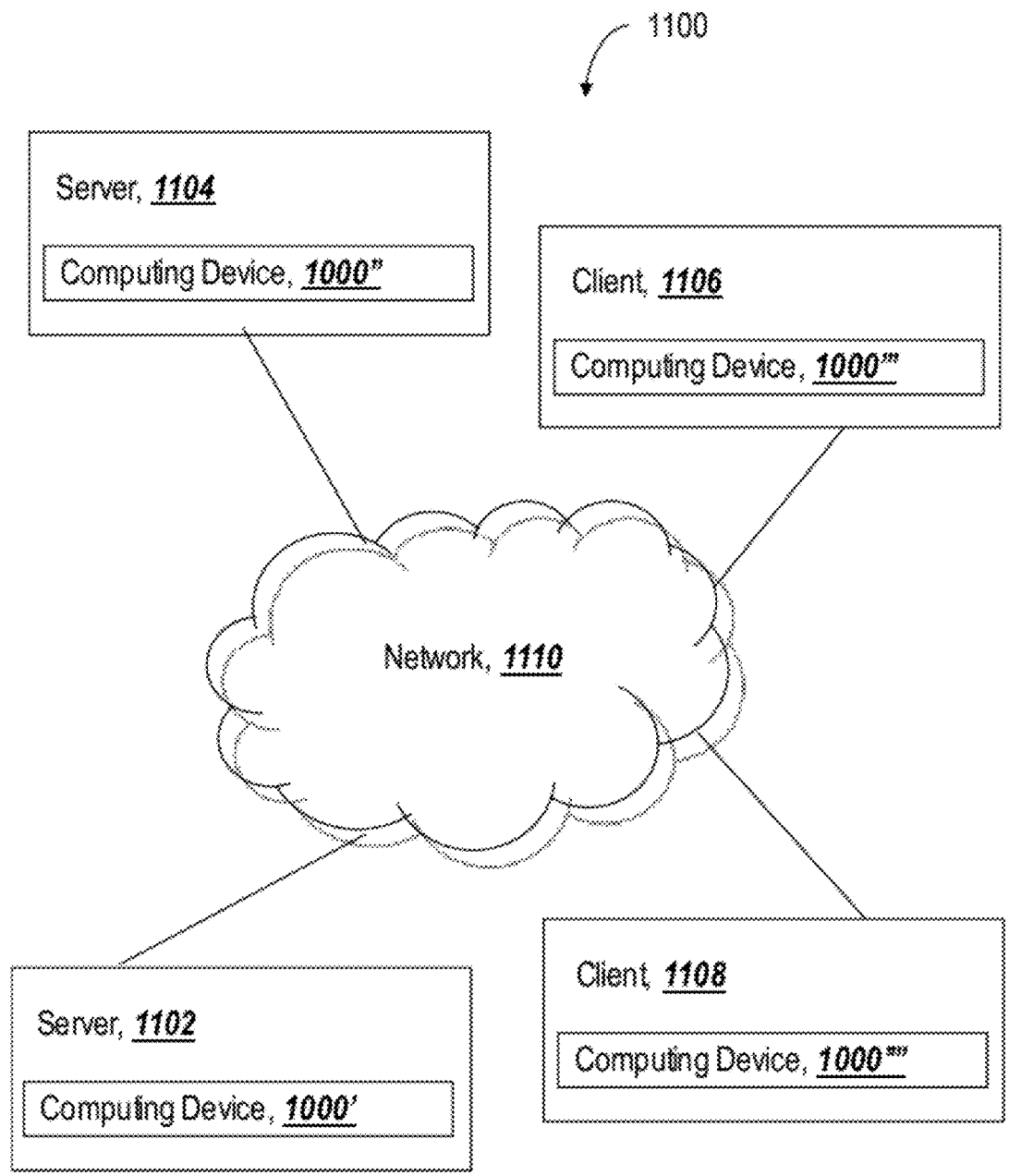
FIG. 2 is a block diagram of an exemplary network environment 1100 suitable for a distributed implementation of exemplary embodiments.

FIG. 2 is a block diagram of an exemplary network environment 1100 suitable for a distributed implementation of exemplary embodiments. The network environment 1100 may include one or more servers 1102 and 1104 coupled to one or more clients 1106 and 1108 via a communication network 1110. The servers 1102 and 1104 may take the form of or include one or more computing devices 1000' and 1000''', respectively, that are similar to the computing device 1000 illustrated in FIG. 1. Similarly, the clients 1106 and 1108 may take the form of or include one or more computing devices 1000''' and 1000'''', respectively, that are similar to the computing device 1000 illustrated in FIG. 1.

The network interface 1012 and the network device 1022 of the computing device 1000 enable the servers 1102 and 1104 to communicate with the clients 1106 and 1108 via the communication network 1110. The communication network 1110 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1110 are capable of supporting distributed implementations of exemplary embodiments.

In an exemplary embodiment, the servers 1102 and 1104 may provide the clients 1106 and 1108 with computer-readable and/or computer-executable components or products under a particular condition, such as a license or use agreement. The computer-readable and/or computer-executable components or products may include those for presenting a user interface. Using computer-readable and/or computer-executable components and products that may have been provided by the servers 1102 and 1104, the clients 1106 and 1108 may present the user interface for a system for generating a user profile. Additionally or alternatively, using computer-readable and/or computer-executable components and products that may have been provided by the servers 1102 and 1104, the clients 1106 and 1108 may present the user interface for a system for improved perception of a user response.

In an exemplary embodiment, the clients 1106 and/or 1108 may receive search queries executed on behalf of a user. The search queries may be initiated by the user through the user interface or run automatically by an associated client 1106 and/or 1108. The clients 1106 and/or 1108 may transmit the search queries via the communication network 1110 to a search engine 1210, which may be located on the servers 1102 and/or 1104. The search engine may transmit the search results via the communication network 1110 to the associated client 1106 and/or 1108.

In some embodiments, the computer-readable and/or computer-executable components or products on the servers 1102 and 1104 may include those for tracking a plurality of parameters associated with an implicit response of a user to the presented search results through at least one user interface and incorporating information derived from the plurality of tracked parameters into a stored profile. Using the computer-readable and/or computer-executable components and products that may have been provided by the servers 1102 and 1104, the clients 1106 and 1108 may track a plurality of parameters associated with an implicit response of a user to the presented search results through at least one user interface and incorporating information derived from the plurality of tracked parameters into a stored profile. The clients 1106 and 1108 may further store and/or use the stored profile locally on one or more storage devices 1030 and/or transmit the stored profile via the communications network 1110 to the servers 1102 and 1104. Using the computer-readable and/or computer-executable components and products that may have been provided by the servers 1102 and 1104, the clients 1106 and 1108 may also perform additional steps.

In some embodiments, the computer-readable and/or computer-executable components or products may include those for tracking explicit responses to the presented search results and a plurality of parameters associated with related implicit responses, through the at least one user interface; for calculating at least one implicit response from the plurality of tracked parameters; and for qualifying at least one explicit response with the at least one implicit response. Using the computer-readable and/or computer-executable components and products that may have been provided by the servers 1102 and 1104, the clients 1106 and 1108 may track explicit responses to the presented search results and a plurality of parameters associated with related implicit responses, through the at least one user interface; calculate at least one implicit response from the plurality of tracked parameters; and qualify at least one explicit response with the at least one implicit response. The clients 1106 and 1108 may further use the at least one qualified explicit response locally on one or more storage devices 1030 and/or transmit the at least one qualified explicit response via the communications network 1110 to the servers 1102 and 1104. Using the computer-readable and/or computer-executable components and products that may have been provided by the servers 1102 and 1104, the clients 1106 and 1108 may also perform additional steps.

III. Exemplary Functional Environments

Figure 3:
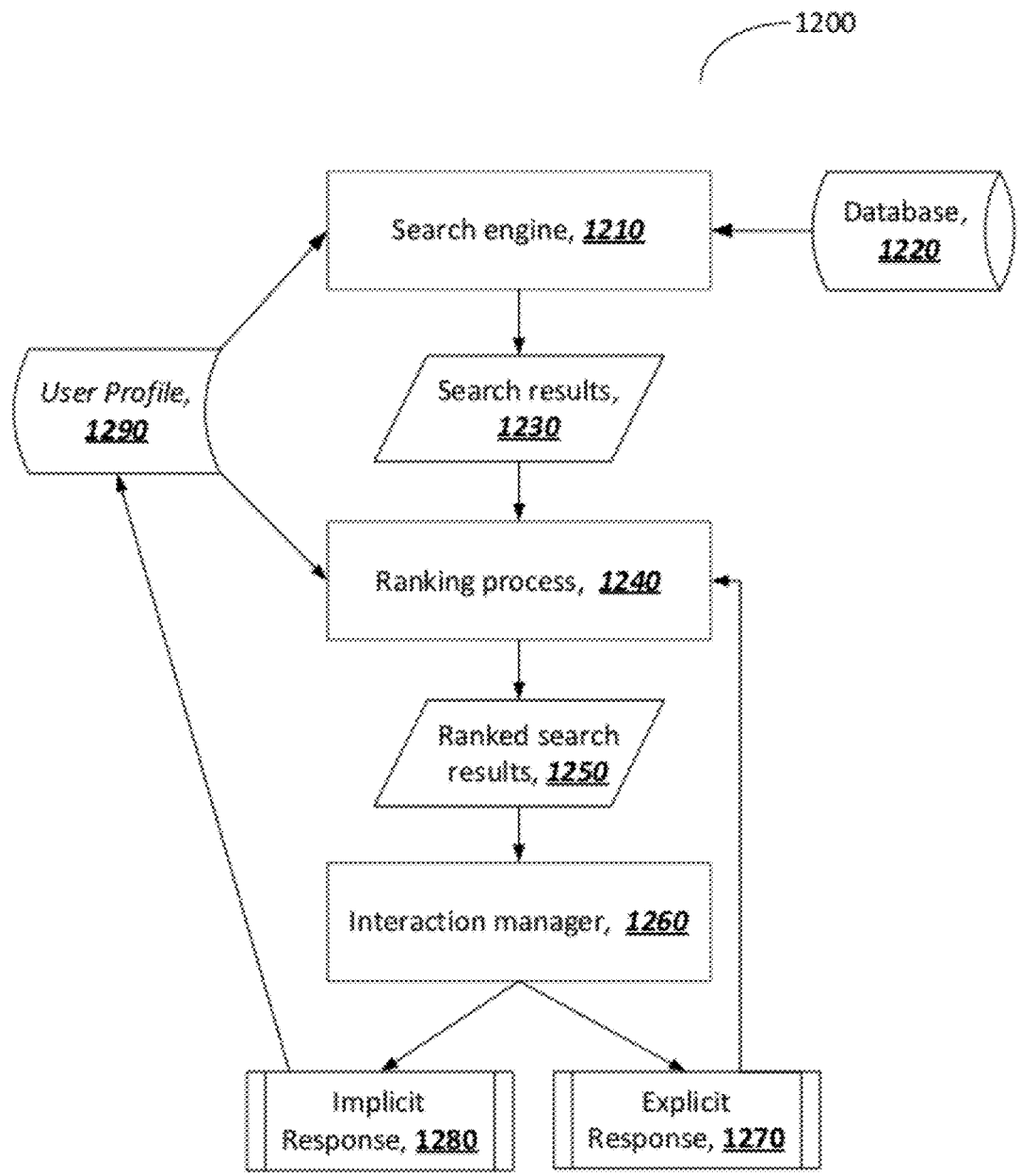
FIG. 3 is a block diagram of exemplary functional components that may be used or accessed in exemplary embodiments.

FIG. 3 is a block diagram of an exemplary environment 1200 of functional components that may be used, or accessed, by exemplary embodiments operating in a network environment 1110. In the exemplary embodiment, a search engine 1210 may be located on the servers 1102 and/or 1104. The search engine 1210 executes search queries originating at an associated client 1106 or 1108. The search engine 1210 may be a web search engine, a vertical search engine, or any other specialized search engine. To execute search queries, the search engine 1210 accesses a database 1220, which may be stored on one or more servers 1102 and 1104. The database may be a general web database or it may focus on a specific segment of online content. Some embodiments of the invention may involve access to a sentiment-based knowledge base, such as disclosed in U.S. patent application Ser. No. 13/344,564, filed on Jan. 5, 2012. The search engine 1210 generates search results 1230.

Figure 4:
FIG. 4 is a block diagram of an exemplary graphical user interface used in exemplary embodiments.

In a ranking process 1240, the search results 1230 are ranked according to the quality of the match with a search query. The ranking process may be conducted either by the responsive server 1102, 1104 or the relevant client 1106 and/or 1108. The ranking process produces ranked search results 1250. In embodiments in server 1102, 1104 performs the ranking process, the search results 1250 are communicated to the relevant client 1106 or 1108 via the communications network 1110. The search results 1250 are presented to the user by the relevant client 1106 or 1108 via the presentation device 1020. FIG. 4 is a block diagram of an exemplary graphical user interface that may be used in embodiments in which the presentation device 1020 is a visual display.

Starting with the presentation of search results, a user may respond to the presented search results via at least one user interface 1025. The user response to the search results 1250 includes both at least one explicit response 1270 and at least one implicit response 1280. One of skill in the art will appreciate that a user interface can offer a wide variety of ways for a user to explicitly respond to the search results. A user interface, for example, may present a one or more rating systems, one or more ways to move from one item to another item within the search results, and/or one or more ways to request additional information about items in the search results. Moreover, the system associates each of the possible explicit responses presented by the user interface with a positive, a negative, or an ambivalent category. The system may further associate each of the possible positive and negative explicit responses with a hard or a soft category.

For example, the at least one explicit response 1270 to the exemplary graphical user interface illustrated in FIG. 4 may include an express selection of almost any element appearing therein. In graphical user interface of FIG. 4, the at least one explicit response 1270 may include selection of either the thumbs up or the thumbs down graphics, the heart graphic, the "Go!" graphic, either of the previous or next triangular arrow graphics, the etcetera graphic, or the title, picture, or map of the featured item.

In various embodiments of the invention, the at least one explicit response 1270 may be used to adjust the ranking process 1240. Only a strong response (also known as a "hard" response) may be used to adjust the ranking process 1240. A user can indicate a hard positive or negative response by the selection of any of the possible explicit responses presented by the user interface and associated with the hard category. For example, a selection of the heart graphic may indicate that the user loves the featured item. Thus, the hard positive response in the form of the explicit heart graphic selection may be input to the ranking process 1240 to modify the ranking of the search results 1250 such that similar items are ranked toward the top of the search results 1250. On the other hand, an express selection of the "Go!" graphic may indicate the user strongly dislikes the featured item. Thus, the hard positive response in the form of the explicit "Go!" graphic selection may be input to the ranking process 1240 to modify the ranking of the search results 1250 such that similar items are ranked toward the bottom of the search results 1250.

The at least one explicit response 1270 may not be used to adjust the ranking process 1240. A moderate response (also known as a "soft" response) will not be used, by itself, to adjust the ranking process 1240. A user can indicate a soft positive or negative response by the selection of any of the possible explicit responses presented by the user interface and associated with the soft category. For example, a selection of the thumbs up graphic is designated as a soft positive response that indicates that the user likes the featured item. Although it is an indication of the user's preferences, the thumbs up graphic selection, by itself, is not used to modify the ranking of the search results 1250. Accordingly, the user will likely continue reviewing the search results in the order they were previously presented. On the other hand, a selection of the thumbs down graphic is designated as a soft negative response that indicates the user dislikes the featured item. Although it is an indication of the user's preferences, the thumbs down graphic selection, by itself, is also not used to modify the ranking of the search results 1250. Accordingly, the user will likely continue exploring the relevant item in the search results 1250.

An ambivalent response (also known as a "blah" response) is neither positive nor negative and will not be used to adjust the ranking process 1240. A user can indicate an ambivalent response by the selection of any of the possible explicit responses presented by the user interface and associated with the ambivalent category. For example, a selection of the etcetera graphic is designated as an ambivalent response that indicates that the user has an uncertain or mixed reaction to the featured item. It is not a clear indication of the user's preferences, and the etcetera graphic selection is not used to modify the ranking of the search results 1250. Accordingly, the user will likely continue reviewing the search results in the order they were previously presented. However, the user may try a different query to get search results closer to his interests and preferences.

In the process of electing the at least one explicit response 1270 to the search results, the user's behavior will exhibit a plurality of parameters that may also be tracked. Upon presentation of search results, an interaction manager 1260 on the relevant client tracks a plurality of parameters associated with the implicit response of the user to the search results 1250 through at least one user interface 1025. The interaction manager 1260 may be a component of the user profile generation system 1032 and/or the improved perception of response system 1036.

The interaction manager 1260 uses these tracked parameters to calculate at least one implicit response 1280. The at least one implicit response can be any measurable behavior that is not an explicit response. Additionally or alternatively, the at least one implicit response can be any information derived from any measurable behavior that is not an explicit response. For example, a delay from the presentation of search results to the user response may generally be a parameter relevant to an implicit response. When the at least one user interface 1025 is a camera, an implicit response may be a movement and/or a facial expression identified by mood recognition software. When the at least one user interface 1025 is a microphone, an implicit response may be a speed of, a volume of, a tone of, and/or a word used in the explicit user response. When the at least one user interface 1025 is a pointing device, an implicit response may be a speed and/or a direction of a pointer movement in the explicit user response. When the at least one user interface 1025 is a touch screen, an implicit response may be a change in a touch associated with in the explicit user response.

A user's implicit response to search results may be calculated at least in part from a comparison with information related to the implicit response in a model user profile 1038 and/or a user profile 1034. For example, a delay from the presentation of search results to the user response may be relatively fast or slow as compared to the norm identified in the model user profile 1038 and/or the user profile 1034. A movement and/or a facial expression captured by a camera may be normal or unusual. A clear change in facial expression may be a stronger implicit response. Similarly, a speed of, a volume of, a tone of, and/or a word captured by a microphone may be normal or unusual. A consistent direction and fast movement of a pointing device may be a stronger implicit response, whereas an inconsistent direction and slow movement of a pointing device may be a softer implicit response.

Information derived from the plurality of tracked parameters used to calculate the at least one implicit response 1280 may be added to at least one user profile 1290. Such information may include measurements of tracked parameters, derivatives of measurements of tracked parameters, the implicit response itself, and/or digests of any of the foregoing. User profile 1290 may be a model user profile 1038 and/or a user profile only associated with the responding user 1034. Information from the individual user profile 1034 may later be used as input to the search engine 1210 to generate customized search results 1230, as input to the ranking process 1240 to generate customized ranked search results 1250, and/or as input to be used in calculating at least one implicit response of the associated user. For example, information from the individual user profile 1034 may be used in a subsequent search session to modify the search query, to adjust the rankings of the search results, and/or to calculate an implicit response of the user.

IV. Exemplary Methods for Improved Perception of User Response

Figure 5:
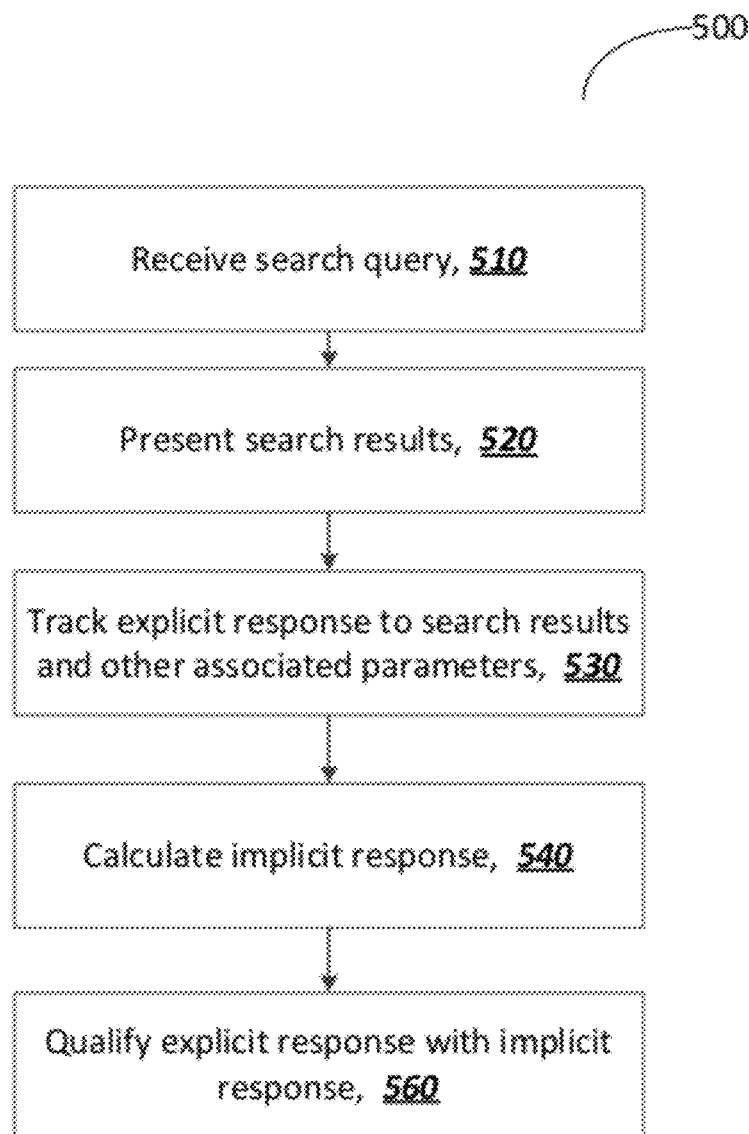
FIG. 5 is a flowchart illustrating a method for generating a user profile according to various embodiments taught herein.

FIG. 5 illustrates a method for improved perception of a user response 500. In step 510, a search query is received, for example by the user interface 1025, according to any of the techniques described above. In step 520, search results are presented by the presentation device 1020. In embodiments of the invention in which the presentation device 1020 is a visual display, the search results are presented in a graphical user interface that enables the user to quickly gather some information and estimate their match with his requirements and preferences. As illustrated in the example of FIG. 4, the graphical user interface may contain textual elements, graphical elements, and imagery. The graphical user interface may augment the search results with additional information about the search results such as why any item in the results was ranked the way it was. For instance, the graphical user interface may display text saying that "other users who are similar to you preferred/rejected this" or "this is similar to something else you selected/preferred."

In embodiments of the invention in which the presentation device 1020 is a speaker, the search results are presented in a voice user interface. Like the graphical user interface, the voice user interface may augment the search results with additional information about the search results such as why any item in the results was ranked the way it was. The voice user interface may also invite the user to explicitly respond in a variety of ways. For example, the voice user interface may invite the user to press buttons, to touch keys, to say words, and/or to make certain motions to indicate different explicit responses.

In step 530 of method 500, the user's response to the search results is tracked through at least one user interface 1025, and possibly multiple such interfaces. The tracked user response encompasses not only at least one explicit response, but also a plurality of parameters associated with a related implicit response. The implicit response may be a timing of the user response, a speed of the user response, a volume of the user response, a tone of the user response, a consistency of the user response, extraneous oral content in the user response, a direction of a pointer movement, a location of a touch, and/or a change in a touch. In step 540, at least one processor uses the plurality of tracked parameters to calculate at least one implicit response. In step 560, the at least one explicit response is qualified by the at least one calculated implicit response. For example, an explicit response that is designated a negative response can be qualified as a hard negative response or as an ambivalent response based on an associated implicit response. An ambivalent response may be qualified as a soft negative response or a soft positive response depending on an associated implicit response. Similarly, an explicit response that is designated a positive response can be qualified as a hard positive response or as an ambivalent response based on an associated implicit response.

For example, a relatively short delay from the presentation of search results to a soft negative explicit response may qualify the explicit response as a hard negative response. A big smile captured by a camera on the user's face after the presentation of search results may qualify a soft positive explicit response as a hard positive response or may similarly qualify an ambivalent response explicit response as a soft positive response. Certain words, such as expletives, that do not qualify as explicit responses may nonetheless be implicit responses that qualify the associated soft negative explicit response as a hard negative response or that qualify the associated ambivalent explicit response as a soft negative response. On the other hand, other words, which express joy or satisfaction but are not explicit responses, may qualify the associated soft positive explicit response as a hard positive response or may qualify the associated ambivalent explicit response as a soft positive response. A fast movement of a pointing device in a consistent direction may qualify a soft explicit response as a hard explicit response. On the other hand, a slow movement of a pointing device in an inconsistent direction may qualify an explicit response as an ambivalent response.

A user's implicit response to search results may be calculated at least in part from a comparison with information derived from a plurality of tracked parameters in a model user profile 1038 and/or a user profile 1034. The information may be measurements of tracked parameters, derivatives of measurements of tracked parameters, implicit responses to the search results, and/or statistical digests of any of the foregoing. Any feature of the implicit response may be compared to a norm in the user profile. A feature that falls outside the norm may indicate a stronger response whereas a feature that falls within the norm may not indicate a stronger response. The norm may be indicated, for example, by a statistical threshold associated with a distribution, a range outside a mean or median, and/or any established threshold. For example, user may add expletives to his explicit response. If the user profile 1038 indicates that that is normal behavior, it may not change the category of the explicit response. If the user profile 1038 indicates that that is unusual behavior, however it may not qualify the explicit response differently. For another example, a delay of the explicit response from the presentation of the search may be relatively slow, normal, or relatively fast when compared to the norm in the user profile. A similar approach may be applied to expressions, movements, tone, volume, pointer movements, and touches. Similar, but less accurate, results may be achieved through the use of the model user profile 1038.

In some embodiments and depending on the qualification of the at least one explicit response, the qualified explicit response may be used as further input to the ranking process 1240 to produce search results 1250 with a modified ranking. Typically, explicit responses that qualify as hard responses may be used to modify rankings of search results. In some embodiments, the implicit response used to qualify an explicit response may be stored in a model user profile 1038. In some embodiments, the implicit response used to qualify an explicit response may be stored in a user profile only associated with the responding user 1034. As noted above, the user profile 1034 may be used in a subsequent search session, for example, as input to the search engine 1210 to generate customized search results 1230 and/or as input to the ranking process 1240 to generate customized the ranked search results 1250.

V. Exemplary Methods for Generating a User Profile

Figure 6:
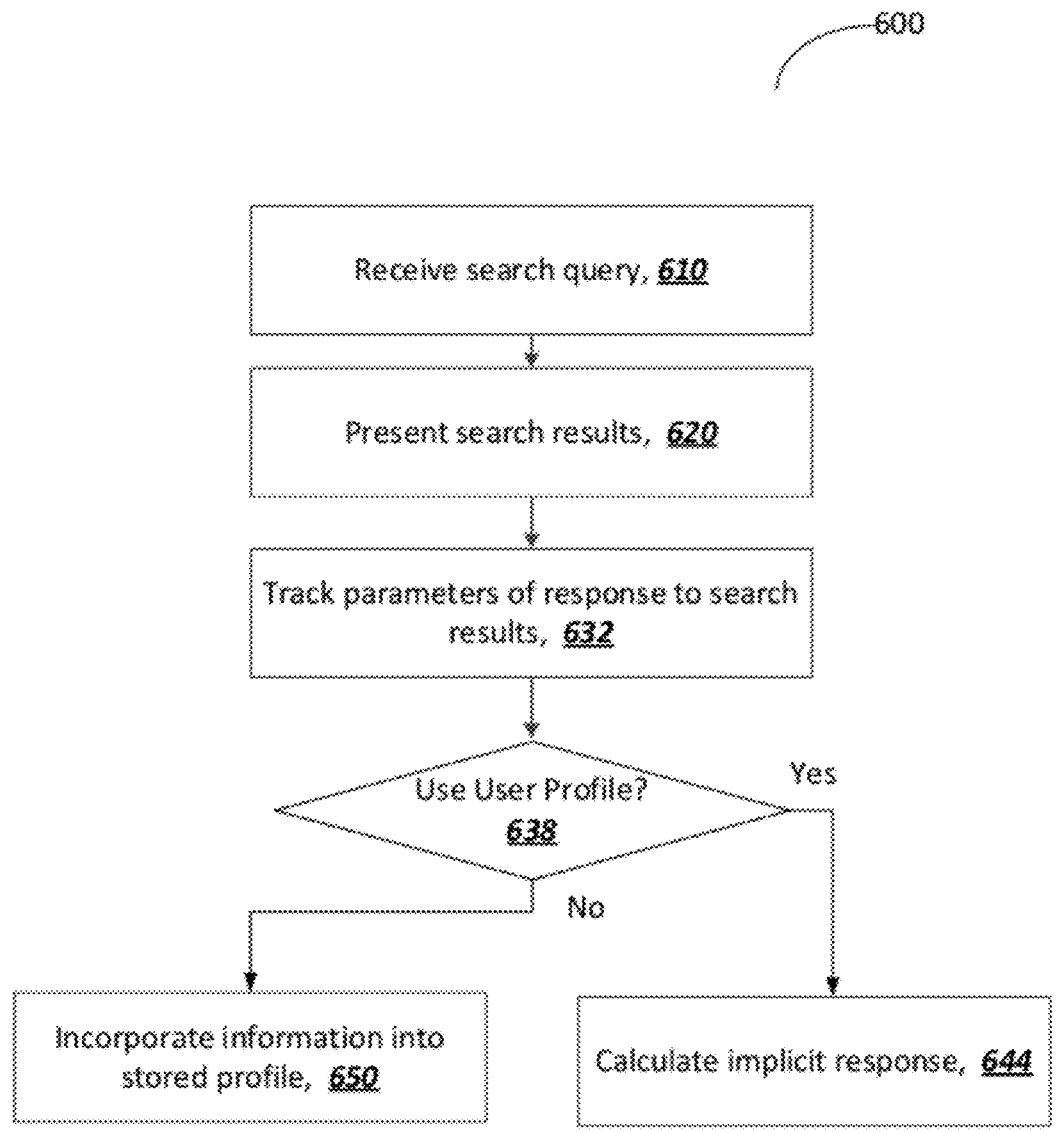
FIG. 6 is a flowchart illustrating a method for improved perception of a user response according to various embodiments taught herein.

FIG. 6 illustrates a method for generating a user profile 600. In step 610, a search query is received, for example through the user interface 1025, according to any of the techniques described above. In step 620, search results are presented by the presentation device 1020 as disclosed above with respect to step 520 of method 500 above. In step 632 of method 600, a plurality of parameters associated with an implicit response of a user to the search results are tracked through at least one user interface 1025. An interaction manager 1260 on the client device presenting the search results, in some embodiments, tracks the plurality of parameters through the at least one user interface 1025.

When a visual display is used to present search results on a graphical user interface, the implicit response may include the order of manipulation of features in the search results. Features that are typically manipulated first or early in the search results implicitly indicate an interest or preference of the user. In contrast, features in the search results that are not typically manipulated or that are typically manipulated later implicitly indicate features that are not an interest or preference of the user. These interests or preferences are another type of implicit response that may be calculated.

In step 638, a determination is made on whether to build or use a user profile in the next step. The determination may be made by a user profile generation systems 1032 or an improved perception of response system 1036. In some embodiments, server 1102, for example, determines whether to use a user profile in the next step. The user profile may be associated with an individual user 1034 or may be a model user profile 1038. Such a determination may, in some embodiments, be based on the input to the user query. In some embodiments, the determination may be based on the settings of relevant client device. In some embodiments, the determination may be based on whether a user profile 1034 exists on the relevant client device or on whether the relevant client device may access a user profile 1034 from one or more servers 1102, 1104. In some embodiments, the determination may be based on whether a user profile associated with the individual user exists on one or more servers 1102, 1104. If the determination to build (i.e., not to use) a user profile is made in step 638, method 600 proceeds to step 650.

In step 650, information derived from the plurality of tracked parameters is incorporated into a user profile 1290. In some embodiments, the user profile 1290 may be a model user profile 1038. In some embodiments, the user profile 1290 may be a user profile only associated with the responding user 1034. In some embodiments, the new information may replace older information and/or information not derived from the responding user. In some embodiments, the new information may be added to older information and/or information not derived from the responding user. In some embodiments, at least one processor derives information at least in part from the implicit response and sends the resulting information to be stored in a user profile thereby incorporating the implicit response into the user profile. The information derived from the tracked parameters may include, for example, measurements of parameter values; derivatives of measurements of parameter values; implicit responses; and any statistical digest of any of the foregoing such as an average, a mean, and/or a median parameter value; a norm for at least one tracked parameter; a distribution of parameter values; and/or a threshold indicator related to a parameter value.

In one exemplary embodiment, the user profile may include information about the user such as the user strongly prefers a hotel with a pool, the user typically chooses a hotel on the bottom of the price spectrum of the area, and/or the user responds within two seconds when presented a hotel that he strongly dislikes.

In some embodiments, at least some information from the user profile 1034 may be used as input to the search engine 1210 to generate customized search results 1230, as input to the ranking process 1240 to generate customized the ranked search results 1250, and/or as input to a filter that modifies how the ranked search results are presented to the user. In some embodiments, at least some information from the user profile may accordingly be used, in a subsequent search session, as input to the search engine 1210 to generate the initial search results 1230, as input to the ranking process 1240 to generate the initial ranked search results 1250, and/or as input to the filter that affects how the ranked search results are initially presented to the user.

Method 600 including steps 610, 620, 632, 638, and 640 may be repeated a plurality of times before the determination to use a user profile is made in step 638. If a determination to use a user profile is made in step 638, the method 600 proceeds to step 644. In step 644, at least one processor calculates an implicit response at least in part by comparing information derived from at least one of the plurality of parameters tracked in step 632 to information in the user profile. For example, the delay from the presentation of the search results to the user response may be short as compared to the mean delay in the user profile 1034. A short delay may imply a hard response versus a soft response. The user may use a lot of expletives as compared to the norm in the user profile. An unusually frequent use of expletives may imply a hard negative response. As another example, the user may inconsistently move a pointer as compared to the norm in the user profile. An unusually inconsistent movement of a pointer may imply a relatively soft or ambivalent response.

In some embodiments, the implicit response from step 644 may be incorporated into a user profile. In some such embodiments, the updated user profile may only be used in a subsequent search session. In some embodiments and as discuss above with respect to step 560, the implicit response from step 644 may be used to qualify an explicit response. The qualified explicit response may then be used within the same search session, for example, to modify search results such as by adjusting the rankings of search results, and/or filtering ranked search results.

VI. Exemplary Use

An exemplary user may enter "Hotel at JFK" through the user interface 1025 as a search query via a graphical user interface presented on visual display presentation device 1020 of a client 1106. The client 1106 may transmit that search query through communication network 1110 to a search engine 1210 on server 1104. The search engine 1210 may access database 1220 and retrieve search results 1230 in the form of a list of hotels near JFK with different features, such as prices, distances from the airport, services, and/or brands. The ranking process 1240 may receive the list of hotels as input and produce ranked search results 1250 in the form of the list of hotels ordered according to certain criteria, such as distance from the airport, price, etc. If the ranking process 1240 resides on the server 1104, the server 1104 may transmit the ranked search results 1250 through communication network 1110 to the client 1106. The presentation device 1020 of the client 1106 may then present the ranked search results 1250 to the user on the graphical user interface. The first item on the list may be "Motel 6 Queens," and a couple of nearby similar hotels may appear nearby on the list due to their similarity.

If the user immediately responds with the explicit response of selecting the "No" icon on the graphical user interface, "Motel 6 Queens" is either removed from the search results or moved to the end of the search results. Moreover, hotels having similar characteristics, such as price, distance, or services, may also be pushed toward the end of the search results. These changes may be made directly by the client 1106 or through the client 1106's interaction with a server.

If the user instead looks at "Motel 6 Queens" for a few minutes and then explicitly responds by selecting the "No" icon on the graphical user interface, the behavior exhibited by the graphical user interface may differ because embodiments use the user's implicit response to qualify the user's explicit response. The user's implicit response that a hotel similar to "Motel 6 Queens" may be suitable qualifies the user's explicit response that "Motel 6 Queens" is not suitable. Accordingly, "Motel 6 Queens" may not be removed from the search results or moved to the end of the search results. Moreover, hotels having similar characteristics, such as price, distance, or services, may also not be pushed toward the end of the search results. The client 1106 may determine that no change to the search results is needed directly or through the client 1106's interaction with a server.

Based on the teachings herein, one of ordinary skill in the art will recognize numerous changes and modifications that may be made to the above-described and other embodiments of the present disclosure without departing from the spirit of the invention as defined in the appended claims. Accordingly, this detailed description of embodiments is to be taken in an illustrative, as opposed to a limiting, sense.

What is claimed is:

1. A computer-implemented method for improved perception of a user response, the method comprising:
    receiving a first search query;
    presenting first search results to the user based on the first search query;
    tracking, through at least one voice interaction device,
        at least one explicit response to the first search results and
        a plurality of parameters associated with at least one implicit response to the first search results,
        wherein the at least one implicit response comprises a tone of the at least one explicit response to the first search results;
    calculating, with a processor, the at least one implicit response to the first search results from the plurality of tracked parameters,
        wherein the at least one implicit response is related to the at least one explicit response; and
    qualifying the at least one explicit response by the at least one implicit response,
        wherein qualifying the at least one explicit response by the at least one implicit response comprises determining whether the at least one explicit response represents a hard explicit response, a soft explicit response, or an ambivalent explicit response, and
        wherein determining whether the at least one explicit response represents a hard explicit response, a soft explicit response, or an ambiguous explicit response comprises comparing the at least one implicit response to a norm in a user profile.

2. The method of claim 1,
    wherein the determining step comprises determining that the at least one explicit response represents a hard explicit response, and further comprising:
    modifying the first search query based on the hard explicit response to generate a second search query; and
    presenting second search results to the user based on the second search query.

3. The method of claim 1
    wherein the determining step comprises determining that the at least one explicit response represents a hard explicit response, and further comprising:
    re-ranking the first search results based on the hard explicit response to generate second search results; and
    presenting the second search results to the user.

4. The method of claim 3
    wherein the hard explicit response comprises a positive response; and
    wherein re-ranking the first search results based on the hard explicit response to generate second search results further comprises reordering items in the first search results such that items similar to the item that elicited the at least one explicit response is ordered toward the top of the second search results.

5. The method of claim 3
    wherein the hard explicit response comprises a negative response; and
    wherein re-ranking the first search results based on the hard explicit response to generate second search results further comprises reordering items in the first search results such that items similar to the item that elicited the at least one explicit response is ordered toward the bottom of the second search results.

6. The method of claim 1
    wherein the determining step comprises determining that the at least one explicit response represents a hard explicit response, and further comprising:
    filtering the first search results based on the hard explicit response to generate second search results; and
    presenting the second search results to the user.

7. The method of claim 6
    wherein the hard explicit response comprises a negative response; and
    wherein filtering the first search results based on the hard explicit response to generate second search results further comprises removing items similar to the item that elicited the at least one explicit response from the first search results to generate the second search results.

8. The method of claim 6
    wherein the hard explicit response comprises a positive response; and
    wherein filtering the first search results based on the hard explicit response to generate second search results further comprises removing items that are not similar to the item that elicited the at least one explicit response from the first search results to generate the second search results.

9. The method of claim 1 wherein first search results are further based on a user profile.

10. The method of claim 1 wherein comparing the at least one implicit response to a norm in a user profile comprises comparing the at least one implicit response to a plurality of implicit responses in the user profile.

11. The method of claim 1 wherein comparing the at least one implicit response to a norm in a user profile comprises comparing the at least one implicit response to information derived from a plurality of past implicit responses in the user profile.

12. The method of claim 1 further comprising storing the qualified explicit response in the user profile.

13. A system for improved perception of a user response, the system comprising:
    at least one processor;
    at least one computer readable medium coupled to the Internet;
    a bus enabling communication between the at least one processor and the at least one computer readable medium; and
    a computer program embodied on the at least one computer readable medium, the computer program comprising:

instructions for receiving a first search query;
instructions for presenting first search results to the user based on the first search query;
instructions for tracking, through at least one voice interaction device,
   at least one explicit response to the first search results and
   a plurality of parameters associated with at least one implicit response to the first search results,
   wherein the at least one implicit response comprises a tone of the at least one explicit response to the first search results;
instructions for calculating, with a processor, at least one implicit response to the first search results from the plurality of tracked parameters,
   wherein the at least one implicit response is related to the at least one explicit response; and
instructions for qualifying the at least one explicit response by the at least one implicit response,
   wherein the instructions for qualifying the at least one explicit response by the at least one implicit response further comprise instructions for determining whether the at least one explicit response represents a hard explicit response, a soft explicit response, or an ambivalent explicit response, and
   wherein the instructions for determining whether the at least one explicit response represents a hard explicit response, a soft explicit response, or an ambiguous explicit response comprises instructions for comparing the at least one implicit response to a norm in a user profile.

14. The system of claim 13 further comprising:
instructions for modifying the first search query based on the hard explicit response to generate a second search query; and
instructions for presenting second search results to the user based on the second search query.

15. The system of claim 13 further comprising:
instructions for re-ranking the first search results based on the hard explicit response to generate second search results; and
presenting the second search results to the user.

16. The system of claim 13 further comprising:
instructions for filtering the first search results based on the hard explicit response to generate second search results; and
presenting the second search results to the user.

17. The system of claim 13 further comprising a storage device connected to the bus wherein the computer program further comprises instructions for storing the qualified explicit response in the user profile.

18. The system of claim 13 wherein the instructions for comparing the at least one implicit response to a norm in a user profile comprises instructions for comparing the at least one implicit response to a plurality of implicit responses in the user profile.

19. The system of claim 13 wherein instructions for comparing the at least one implicit response to a norm in a user profile comprises instructions for comparing the at least one implicit response to information derived from a plurality of past implicit responses in he user profile.

* * * * *